United States Patent [19]

Ishigaki

[11] 3,944,754
[45] Mar. 16, 1976

[54] RECORD DISC RECORDING SYSTEM WITH SIGNAL AMPLITUDE CONTROLLED BY STYLUS ARM POSITION

[75] Inventor: Yukinobu Ishigaki, Yamato, Japan

[73] Assignee: Victor Company of Japan, Ltd., Yokohama, Japan

[22] Filed: Mar. 26, 1974

[21] Appl. No.: 454,908

[30] Foreign Application Priority Data
  Mar. 26, 1973  Japan.............................. 48-34389
  Mar. 26, 1973  Japan.............................. 48-34390

[52] U.S. Cl..................... 179/100.4 C; 179/100.4 D
[51] Int. Cl.².............................................. G11B 3/00
[58] Field of Search 179/100.4 C, 100.4 A, 100.4 D, 179/100.4 E, 100.4 F

[56] References Cited
UNITED STATES PATENTS

| | | |
|---|---|---|
| 2,320,429 | 6/1943 | Hasbrouck, Jr.............. 179/100.4 C |
| 2,326,564 | 8/1943 | Rigby et al................... 179/100.4 C |
| 3,084,337 | 4/1963 | Willard........................ 179/100.4 D |
| 3,229,048 | 1/1966 | Fox............................. 179/100.4 C |
| 3,403,233 | 9/1968 | Cooper........................ 179/100.4 C |

*Primary Examiner*—Bernard Konick
*Assistant Examiner*—Alan Faber

[57] ABSTRACT

A record disc recording system comprises a circuit for generating a control signal voltage corresponding to the position of a cutter head on a disc. The system also includes a limiting amplifier control and a control circuit for controlling the gain of the limiting amplifier in accordance with the control signal voltage. Responsive to the control signal, the limiting amplifier successively increases the degree of limiting, as the cutter head moves from the outer periphery to the inner periphery of the disc, thereby limiting amplitude with respect to the signal.

3 Claims, 24 Drawing Figures

RECORD DISC RECORDING SYSTEM WITH SIGNAL AMPLITUDE CONTROLLED BY STYLUS ARM POSITION

BACKGROUND OF THE INVENTION

The present invention relates generally to a system for recording signals on a record disc. More particularly, it relates to a record disc recording system which limits the level of the amplification of the recording signal, to successively decrease it, as the record cutting progresses from the outer periphery toward the inner part of a disc.

In general, the difference between relative linear velocity of a disc rotating at a constant rotational speed and a pickup cartridge reproducing signals from the disc differs at the outer peripheral part and the inner part of the record because of the difference in their radii. The tracing state of the pickup cartridge, relative to the disc, becomes worse as the cartridge moves, from the outer periphery toward the inner part thereof.

Particularly consider a case where the recorded program is a symphony or the like, for example, having a loud climax in the finale. This finale is recorded on the inner part of the disc where tracing distortion increases and greatly impairs the reproduced tone quality.

Furthermore, consider a multichannel record disc of a discrete system which applicant has previously developed and which is being widely used. An angle-modulated wave and a direct wave signal are recorded on the disc in a multiplexed state. Accordingly, as the pickup cartridge advances toward the inner part of the disc, and the distortion increases as described above, there is also the possibility of the higher harmonics of the direct wave signal entering the angle-modulated wave band to give rise to cross modulation or overmodulation and abnormal noises.

In order to solve this problem, it has been the conventional practice either to lower the entire level of the recording signal or to use a limiting amplifier for automatic gain control with respect to the recording signal. This amplifier is set so that the gain control will be carried out in a large extent.

All of these conventional measures, however, have been accompanied by difficulties such as the loss of the sensation of sound volume over the entire program. Small dynamic range at the time of recording due to an even lowering of the recording signal level as the recording progresses from the outer periphery to the inner periphery of the disc. Or, there is a suppressing of the maximum levels below a relatively low specific level.

SUMMARY OF THE INVENTION

Accordingly, it is a general object of the present invention to provide a novel and useful record disc recording system in which the above described difficulties have been overcome.

A specific object of the invention is to provide a system for recording on a record disc by varying the limiting amplitude of the recording signal. Limiting becomes progressively greater as the cutting stylus moves from the outer periphery toward the inner periphery of the disc.

Another object of the invention is to provide a record disc recording system in which use is made of a limiting amplifier for accomplishing automatic gain control in a manner such that, as the cutting stylus moves from the outer periphery toward the inner periphery of the disc, the maximum level of the recording signal progressively decreases.

Still another object of the invention is to provide a record disc recording system in which use is made of a limiting amplifier for accomplishing automatic gain control in a manner such that, as the cutting stylus moves from the outer periphery toward the inner periphery of the disc, the gain of the entire recording signal is controlled. There is a constant level for the start of limiting, at which the input recording signal begins to be limited in amplitude. The maximum level of the recording signal progressively decreases.

A further object of the invention is to provide a record disc reproducing system in which recording is carried out on a record disc by accomplishing automatic gain control in a manner such that, as the cutting stylus moves from the outer periphery toward the inner periphery of the disc, the maximum level of the recording signal decreases stepwise and progressively.

Other objects and further features of the invention will be apparent from the following detailed description with respect to preferred embodiments of the invention when read in conjunction with the accompanying drawings.

DETAILED DESCRIPTION

Figure 1:
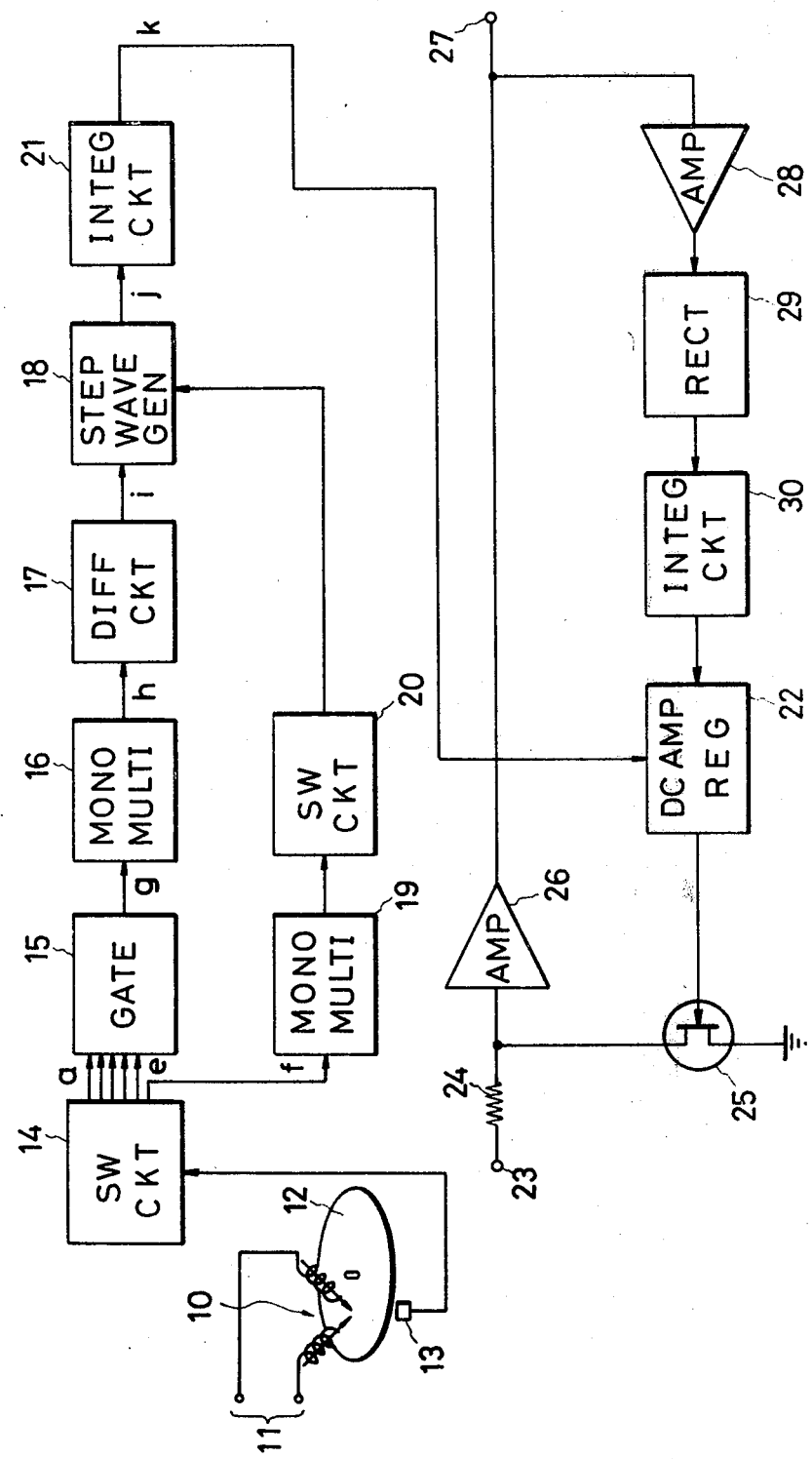
FIG. 1 is a block diagram showing the essential organization of a first embodiment of the record disc recording system according to the invention.
Figure 2:
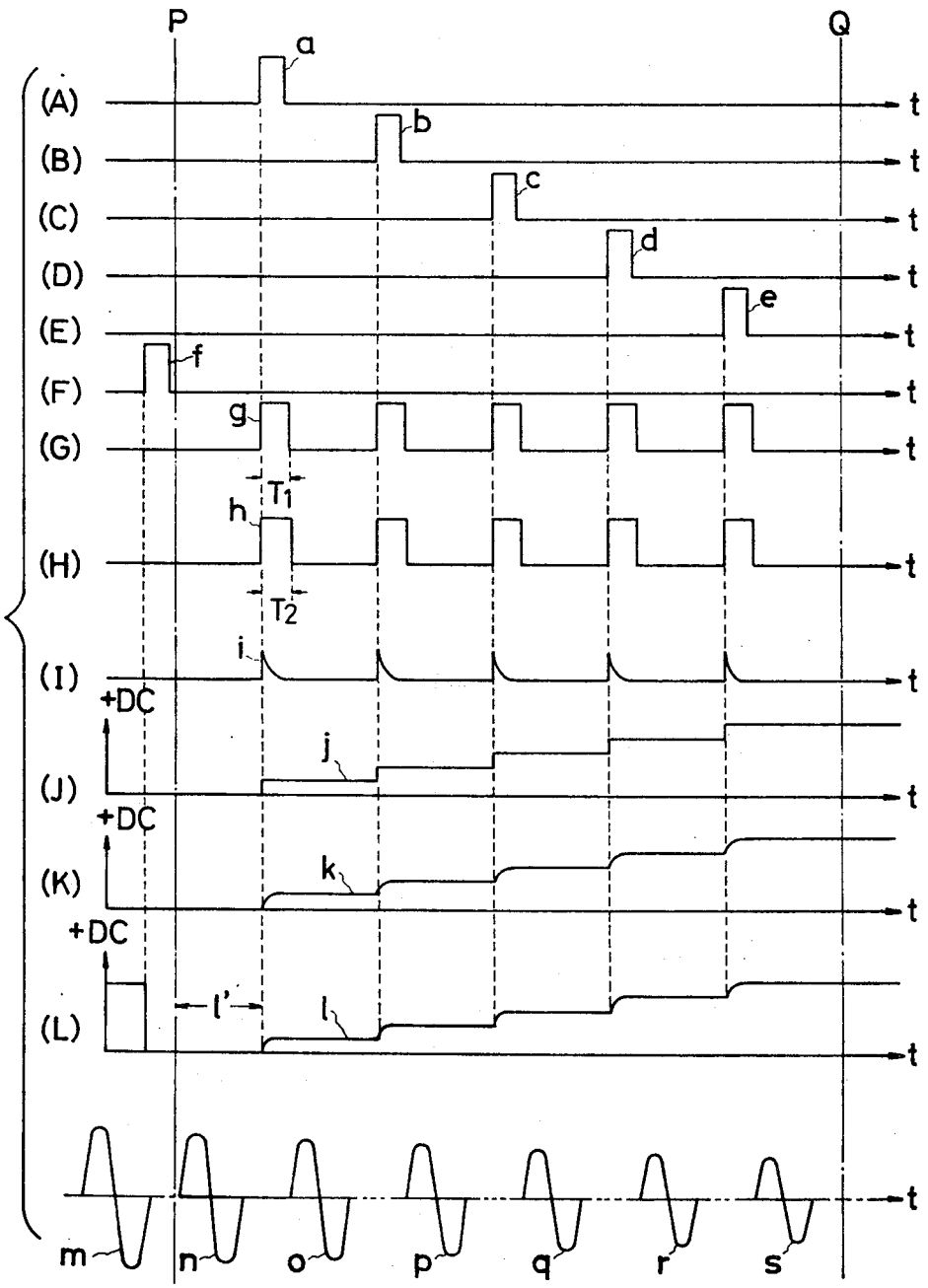
FIGS. 2(A) through 2(M) are time charts respectively indicating the waveforms of signals appearing at various parts of the system illustrated in FIG. 1.
Figure 3:
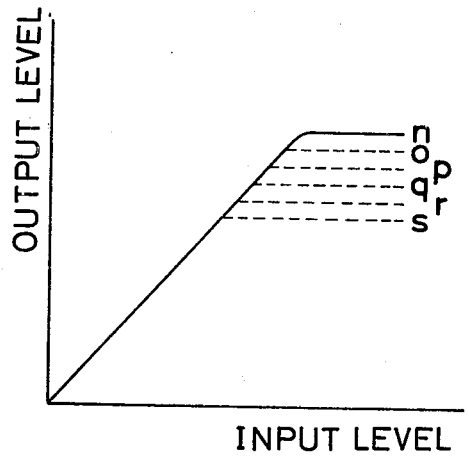
FIG. 3 is a graph indicating the input-output level characteristic of a limiting amplifier used in the system shown in FIG. 1.

Referring first to FIGS. 1, 2, and 3, the first embodiment of the record disc recording system of the invention will be described.

A cutting machine 10 receives through input terminals 11, a recording signal which has been subjected to a specific signal processing, including amplitude limiting as described hereinafter. Accordingly, the system records this signal by cutting it on a disc 12. The cutter head of the cutting machine 10 so records by cutting the disc 12, from the outer periphery toward the inner periphery thereof. A detector 13 successively detects the position of the cutter head at specific intervals in the period during which the cutter head moves from the outer periphery to the inner periphery. In response to this detection, a switching circuit 14 successively produces pulse voltages a through e, as indicated in FIGS. 2(A) through 2(E). The time points P and Q, indicated by single-dot chain lines, are respectively the lead-in time point and the lead-out time point.

The pulse voltages a through e thus generated by the switching circuit 14 are supplied to a gate circuit 15, which operates in response to these pulse voltages to produce successively pulse voltages g, of a pulse width T1, as indicated in FIG. 2(G). These pulse voltages g are conducted to a monostable multivibrator 16, where they are shaped into pulse voltages h having a pulse width T2, which is slightly wider than the above mentioned pulse width T1, as indicated in FIG. 2(H). These pulse voltages are then differentiated by a differentiation circuit 17 to produce spike pulses i, as indicated in FIG. 2(I). Pulses i are supplied to a stepped or grated wave generator 18.

On one hand, prior to the lead-in time point P, a reset pulse f, as indicated in FIG. 2(F), is produced from the switching circuit 14 and sent to a monostable multivibrator 19, where it is wave shaped and then conducted to a switching circuit 20. The output of this switching circuit 20 is supplied to the above mentioned stepped wave generator 18. It discharges a stepped wave voltage which has been charged by the preceding cycle, thereby to reset this stepped wave generator 18 prior to the start of the application thereto of the above mentioned differentiated pulses i.

The stepped wave generator 18 is reset in this manner, upon being successively supplied with the differentiated pulses i as described above. It successively stores these pulses and produces a stepped wave j of a voltage value which increases in a stepwise manner, as indicated in FIG. 2(J). This stepped wave j is sent to an integration circuit 21 where it is transformed into a wave of an integrated waveform k or l. The step angle of waveforms k, l is gentle and rounded, as indicated in FIG. 2(K) or 2(L). In FIGS. 2(K) and 2(L), the waveforms k and l are identical. The only difference between these two figures is that FIG. 2(L) indicates that there is a voltage which is charged prior to the resetting by the reset pulse f. The voltage of the waveform k or l is supplied as a control voltage to a DC amplifier and regulating circuit 22 provided in the feedback path of a limiting amplifier.

An audio signal from a microphone or an audio signal reproduced from a tape recorder is amplified by an amplifier and supplied to an input terminal 23. This audio signal m, which has entered through the input terminal 23, is indicated in FIG. 2(M) (in which this audio signal is idealized and indicated for only one cycle although it is continuous and its amplitude varies in various ways). Its voltage is divided by a resistor 24 and a field effect transistor (FET) 25 functioning as a variable resistance element. The divided voltage is supplied to a main amplifier 26 and is there amplified.

The amplified output signal of the main amplifier 26 passes through a control signal amplifier 28. After being rectified by a rectifier 29, it is converted into a control voltage by an integration circuit 30. The control voltage produced as the output of the integration circuit 30 is supplied to the above mentioned DC amplifier and regulating circuit 22.

In response to this control voltage, the DC amplifier and regulating circuit 22 control the control voltage from the integration circuit 21. The resulting control voltage produced an an output of the circuit 22 is impressed on the gate of FET 25, which varies its internal resistance between the drain and source thereof. The gain of the amplifier is controlled by variations of the impedance of the FET 25.

Accordingly, as the cutter head of the cutting machine 10 cuts and records from the outer periphery toward the inner periphery of the disc 12, the limiting level of limiting amplifier 26 and the feedback path thereof is successively lowered in the order $n, o, p, \ldots s$, as indicated by the input-output level characteristic in FIG. 3. As a consequence, the limiting amplifier limits amplitude by successively deepening (i.e., increasing) the degree of amplitude limiting as indicated at $n, o, p, \ldots s$ in FIG. 2(M), with respect to the input signal of the amplitudes indicated by m in FIG. 2(M). In this connection, since there is no control voltage in the initial period l, as indicated in FIG. 2(L), only a constant and fixed bias is applied to the gate of the FET 25. The gain of the limiting amplifier is a maximum in this period l'. An output signal n is obtained with respect to an input signal m, as indicated in FIG. 2(M). Furthermore, in actual practice, the period during which the signal s is produced occurs somewhat prior to the lead-out time point Q.

The output signal of the amplifier 26 is limited in amplitude, as described above. Then it is led out through an output terminal 27. If the recording system of the present invention is applied to a discrete multichannel record disc recording system, the output signal from the output terminal 27 is supplied to a matrix circuit (not shown) where it is formed into sum and difference signals, each containing the signals of two channels. The sum signal is passed through a specific equalizing circuit, while the difference signal is passed through a specific equalizing circuit and then angle modulated. The resulting direct wave sum signal and the angle-modulated wave difference signal are multiplexed, amplified, applied to the input terminal 11 of the cutter head of the aforementioned cutting machine 10, and thereby recorded on the disc 12.

The input signal applied to the aforementioned input terminal 23 may be an audio signal covering the entire frequency band. In this case, only one system, as indicated by block diagram in FIG. 1, may be provided. Furthermore, an arrangement may use a plurality of systems, for example, three systems, each as indicated in FIG. 1, there may be in a single recording system. The recording signal is divided into a low-band signal, a medium-band signal and a high-band signal by a low-pass filter, a band-pass filter, and a high-pass filter. The signals thus divided are respectively conducted to corresponding limiting amplifiers among the limiting amplifiers of the above mentioned three systems. In this case, depending on the program source of the signal to be recorded, the degree of amplitude limiting can be selected at will for each band. For example, the degree of amplitude limiting with respect to a low-band signal can be made greater than that with respect to signals of other bands.

Furthermore, the stepped wave generator 18 in the above described embodiment operates in response to the output pulses a through e of the switching circuit 14 cooperating with the detector 13 to produce a stepped wave voltage varying in five steps. The number of steps is not limited to five, but may be any plural number. Moreover, the voltage may, of course, rise continuously and progressively.

Figure 5:
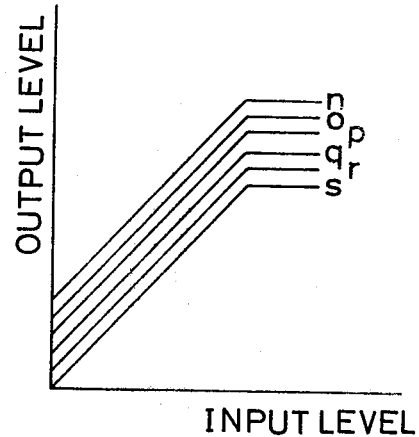
FIG. 5 is a graph indicating the input-output level characteristic of a limiting amplifier in the system shown in FIG. 4.
Figure 4:
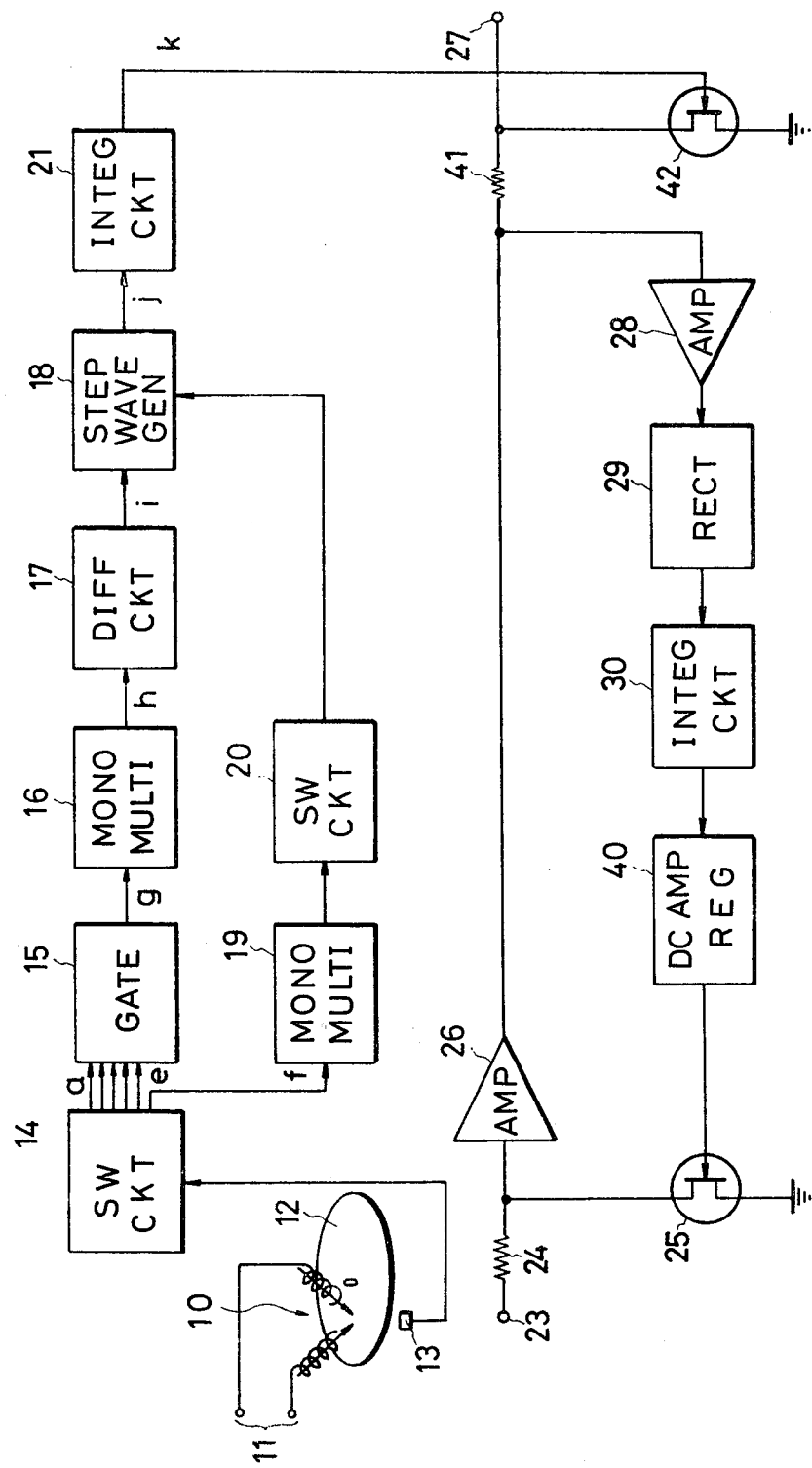
FIG. 4 is a block diagram showing the essential organization of a second embodiment of the record disc recording system according to the invention.

Referring now to FIGS. 4 and 5, the second embodiment of the record disc recording system of the invention will be described. In FIG. 4, parts which are the same as corresponding parts in FIG. 1 are designated by the same reference numerals, and detailed description of these parts will not be repeated.

In the preceding embodiment, as is apparent from FIG. 3, the limiting level varies in the order $n, o, p, \ldots s$. The critical points of the limiting operation (i.e., the input level points corresponding to the bends in the curves shown in FIG. 3 where the recording parts join the straight-line parts) vary from large to small relative to the input level. This variation is conformance with the variations from large to small of the limiting level. In the instant embodiment illustrated in FIGS. 4 and 5, the limiting operation critical point does not vary even when the limiting level varies.

The signal part of the output of the main amplifier 26 passes through the control signal amplifier 28, rectifier 29, and integration circuit 30. It is amplified by a DC amplifier 40 and then applied to the gate of the FET 25. The gain of the main amplifier 26 is thus controlled. The output of amplifier 26 is led out from the output terminal 27 in accordance with the divided voltage value due to a resistance value of a resistor 41 and the resistance value of a FET 42.

The stepped control voltage $k$ from the integration circuit 21 is impressed on the gate of the FET 42, and thereby varies the internal resistance thereof. The drain and source of this FET 42 are connected between the output terminal 27 and ground (earth).

In the instant embodiment, the FET 42 is provided on the output side of the amplifier 26. The internal resistance thereof is controlled by the control voltage $k$. The relationship between the input signal level at the input terminal 23 and the output signal level at the output terminal 27 is as indicated in FIG. 5. As is apparent from this graph, the limiting critical point (i.e., the input level point corresponding to the bend in the curves) is always constant. All of the input-output level characteristic curves vary by decreasing in the order $n, o, p, \ldots s$, in accordance with the above mentioned control voltage $k$.

Embodiments of specific circuits for the stepped wave generator 18 used in the above described embodiments of systems will now be described.

Figure 6:
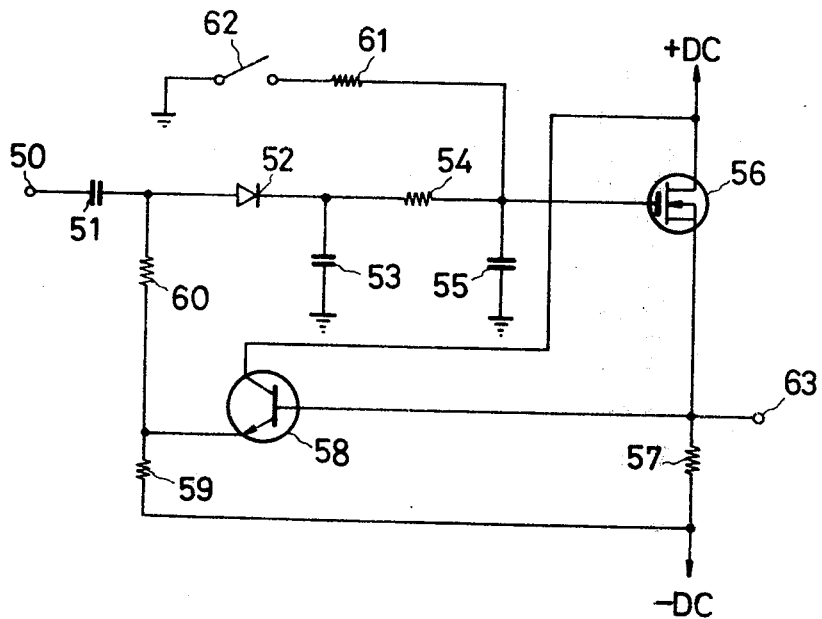
FIG. 6 is a specific circuit diagram of one embodiment of a stepped or graded wave generator used in the system shown in FIGS. 1 and 4.
Figure 7:
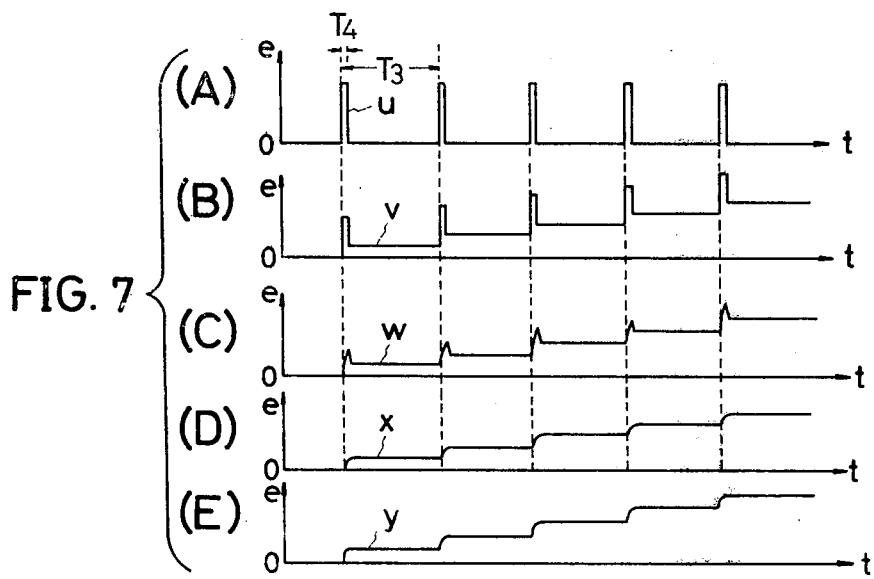
FIGS. 7(A) through 7(B) are time charts respectively indicating the waveforms of signals at various parts of the circuit illustrated in FIG. 6.

In one embodiment circuit as shown in FIG. 6, a pulse voltage $u$ (corresponding to the pulse voltage $i$ indicated in FIG. 2(I)) has a period T3 and a pulse width T4, as indicated in FIG. 7(A). Pulse $u$ is supplied from the differentiation circuit 17 to an input terminal 50. A coupling capacitor 51 removes the DC component of this pulse voltage $u$. A capacitor 53 is charged responsive to pulse $u$ applied by way of a silicon diode 52. The charging at this time is accomplished instantaneously since the time constant due to the forward direction resistance of the diode 52 and the capacitance of the capacitor 53 are set at a suitably small value.

In a period wherein the pulse voltage does not exist, the charge in the capacitor 53 is discharged through a resistor 54 to charge a capacitor 55. The time constant due to this capacitor 55 and the resistor 54 is selected to be in the order of approximately 10 times the time constant due to the forward-direction resistance of the diode 52 and the capacitor 53. Here, the capacitors 53 and 55 and the resistor 54 constitute a CR-$\pi$ type integration circuit.

The capacitors 53 and 55 continue their charging and discharging, as described above, until the charging voltages become equal. When the two voltages become equal, the two capacitors hold constant voltage charge. This voltage is impressed on the gate of a FET 56 having its drain supplied with a positive DC voltage. Its source is biased with a negative DC voltage applied by way of a resistor 57. A voltage obtained from the source follower resistor 57 of the FET 56 is impressed on the base of an NPN transistor 58. Its collector is connected to a positive DC power supply. Its emitter is connected by way of a resistor 59 to a negative DC power supply. A DC output voltage is led out of the emitter of this transistor 58 and fed back by way of a resistor 60 to the anode side of the diode 52. As a consequence, the potential on the anode side of the diode 52 assumes a bootstrap voltage waveform $v$, as indicated in FIG. 7(B).

As a consequence, the above mentioned pulse voltage $u$ is successively applied, with a period T3, to the input terminal 50. Thereupon, a pulse current passing through the diode 52 charges capacitor 53. The charge is in a state wherein it is superimposed on the potential of the anode side of the diode 52. At this time, a charging voltage $w$, of a waveform as indicated in FIG. 7(C), appears at the capacitor 53. As a result of the application of this charging voltage $w$, the charging voltage of the above mentioned capacitor 55 becomes a voltage $x$ of a waveform as indicated in FIG. 7(D). From an output terminal 63, a voltage $y$ of stepped waveform is obtained wherein all step potentials are equal, as indicated in FIG. 7(E).

The resetting of the circuit is accomplished as follows. By equivalently closing a switch 62 (corresponding to the switching circuit 20 in the system shown in FIG. 1) through the use of the output of the monostable multivibrator 19, the charge in the capacitor 55 is discharged through a resistor 61.

In the instant embodiment, if the pulse width of the pulse voltage $u$ to be applied is suitably wide, it is also possible to differentiate beforehand the input pulse voltage $u$ by means of the capacitor 51 and the resistor 60. The resulting pulse voltage is supplied to the anode of the diode 52. Furthermore, by changing the values of the capacitor 53, the resistor 54, and the capacitor 55, the pulse width and pulse height of the pulse voltage $u$ change the pulse potential impressed on the diode 52. Thus, it is possible to change the step potential of the stepped wave.

Furthermore, when a diode of extremely small inverse current is selected for the silicon diode 52, a FET of the MOS type is selected for the FET 56. Capacitors 53 and 55 and a resistor 54 of large constants are selected. Thus, it is possible to always obtain an output signal of excellent stepped waveform from the output terminal 63, even with respect to an input pulse voltage of long period such as, for example, a pulse voltage $u$ of a period T3 of 1,800 seconds.

Figure 8:
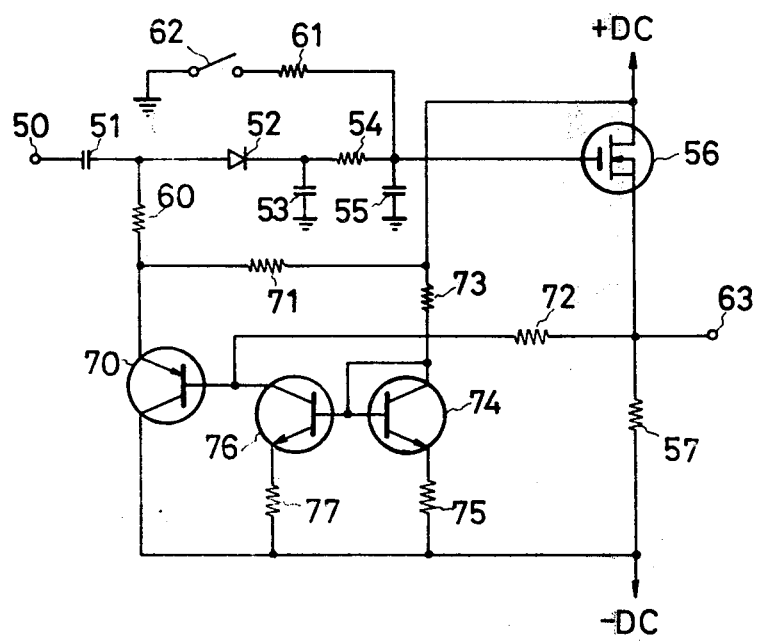
FIG. 8 is a specific circuit diagram of another embodiment of the stepped wave generator.

Another embodiment of a specific circuit for the stepped wave generator is shown in FIG. 8. Parts which are the same as corresponding parts in the circuit of FIG. 6 are designated by like reference numerals. These parts will not be described in detail again.

A PNP transistor 70 is used for temperature compensation of the circuit. The emitter of transistor 70 is connected by way of the resistor 60 and a resistor 71 to a positive DC power supply, while its collector is connected to a negative DC power supply. Resistors 72, 73, 75 and 77 and NPN transistors 74 and 76 constitute a constant-current circuit and accomplish level shifting of output current. The circuit of the instant embodiment is capable of operating with greater stability than the circuit of the preceding embodiment.

Further, this invention is not limited to these embodiments. Variations and modifications may be made without departing from the scope and spirit of the invention. Therefore, the appended claims are to be construed to cover all equivalent structures.

What is claimed is:

1. A record disc recording system comprising: cutting and recording means having a cutter head for cutting and recording signals on a rotating disc with cutting extending from the outer periphery toward the inner periphery thereof; means for generating position pulse signals at successive specific intervals during the period while the cutter head moves from the outer periphery across the disc to the inner periphery thereof; means responsive to the position pulse signals for generating a control voltage of a stepped waveform, said control voltage increasing in successive steps responsive to the receipt of each of the position pulse signals; limiting amplification means for amplitude limiting input recording signals; control means for controlling the gain of said limiting amplification means in accordance with said control voltage whereby the degree of the amplitude limiting of the recording signals increases successively as the cutter head moves from the outer periphery over the disc toward the inner periphery thereof; means for applying the output signals of said limiting amplification means to said cutter head in which said limiting amplification means comprises voltage dividing means including a series combination of a resistor and a variable resistance element, means for applying recording signals across said voltage dividing means, a main amplifier for amplifying the signal appearing across the variable resistance element; said control means comprises rectifier means for rectifying one portion of the output signal of said main amplifier and integrating the rectified signal to produce a second control voltage, DC amplifier and regulating circuit means responsive jointly to the control voltage of said stepped waveform and to the second control voltage for amplifying the control voltage of said stepped waveform while the gain of said DC amplifier and regulating circuit means is controlled responsive to the second control voltage, and means for controlling the resistance value of said variable resistance element in accordance with the output signal of said DC amplifier and regulating circuit means.

2. A record disc recording system comprising: cutting and recording means having a cutter head for cutting and recording signals on a rotating disc with cutting extending from the outer periphery toward the inner periphery thereof; means for generating position pulse signals at successive specific intervals during the period while the cutter head moves from the outer periphery across the disc to the inner periphery thereof; means responsive to the position pulse signals for generating a control voltage of a stepped waveform, said control voltage increasing in successive steps responsive to the receipt of each of the position pulse signals; limiting amplification means for amplitude limiting input recording signals; control means for controlling the gain of said limiting amplification means in accordance with said control voltage whereby the degree of the amplitude limiting of the recording signals increases successively as the cutter head moves from the outer periphery over the disc toward the inner periphery thereof; means for applying the output signals of said limiting amplification means to said cutter head in which said limiting amplification means comprises first voltage dividing means including a first series combination of a first resistor and a first variable resistance element, means for applying the recording signals across said voltage dividing means, a main amplifier for amplifying the signal appearing across the first variable resistance element, a second series comprising a combination of a second resistor and a second variable resistance element, means for applying the output signal of said main amplifier across said second series, means for taking out the signal appearing across the second variable resistance element as the output signal of said limiting amplification means; said control means comprises rectifier means for rectifying one portion of the output signals of said main amplifier and integrating the rectified signal to produce a second control voltage, means for controlling the resistance value of said first variable resistance element in accordance with the second control voltage, and means for controlling the resistance value of said second variable resistance element in accordance with the control voltage of said stepped waveform.

3. A record disc recording system comprising: cutting and recording means having a cutter head for cutting and recording signals on a rotating disc with cutting extending from the outer periphery toward the inner periphery thereof; means for generating position pulse signals at successive specific intervals during a period while the cutter head moves from the outer periphery across the disc to the inner periphery thereof; means responsive to the position pulse signals for generating a control voltage of a stepped waveform, said control voltage increasing in successive steps responsive to the receipt of each of the position pulse signals; limiting amplification means for amplitude limiting input recording signals; control means for controlling the gain of said limiting amplification means in accordance with said control voltage whereby the degree of the amplitude limiting of the recording signals increases successively as the cutter head moves from the outer periphery over the disc toward the inner periphery thereof; means for applying the output signals of said limiting amplification means to said cutter head in which said control voltage generating means comprises a diode for rectifying the position pulse signals, integration circuit means for integrating the charges of the current flowing through said diode; a field effect transistor having a drain electrode connected to a first reference voltage source, a source electrode connected through a first resistor to a second reference voltage source, and a gate electrode connected to receive the output signal of said integration circuit means; a transistor having a collector electrode connected to the first reference voltage source, an emitter electrode connected through a second resistor to the second reference voltage source and also connected through a third resistor to the input side of said diode, and a gate electrode connected to the source electrode of said field effect transistor.

\* \* \* \* \*